US011525897B2

(12) United States Patent
Schultz

(10) Patent No.: US 11,525,897 B2
(45) Date of Patent: Dec. 13, 2022

(54) LIDAR SYSTEM PRODUCING MULTIPLE SCAN PATHS AND METHOD OF MAKING AND USING SAME

(71) Applicant: Pictometry International Corp., Rochester, NY (US)

(72) Inventor: Stephen L. Schultz, West Henrietta, NY (US)

(73) Assignee: Pictometry International Corp., Rochester, NY (US)

( * ) Notice: Subject to any disclaimer, the term of this patent is extended or adjusted under 35 U.S.C. 154(b) by 291 days.

(21) Appl. No.: 16/694,045

(22) Filed: Nov. 25, 2019

(65) Prior Publication Data

US 2020/0096618 A1    Mar. 26, 2020

Related U.S. Application Data

(63) Continuation of application No. 14/993,725, filed on Jan. 12, 2016, now Pat. No. 10,502,813, which is a
(Continued)

(51) Int. Cl.
*G01S 7/481* (2006.01)
*G02B 26/10* (2006.01)
(Continued)

(52) U.S. Cl.
CPC ............ *G01S 7/4817* (2013.01); *G01S 7/484* (2013.01); *G01S 17/08* (2013.01); *G01S 17/42* (2013.01); *G02B 26/101* (2013.01); *G02B 26/12* (2013.01)

(58) Field of Classification Search
CPC ........ G01S 7/4817; G01S 7/484; G01S 17/08; G01S 17/42; G02B 26/10; G02B 26/101;
(Continued)

(56) References Cited

U.S. PATENT DOCUMENTS 2,273,876 A    2/1942  Lutz et al.
3,153,784 A    10/1964 Petrides et al.
(Continued)

FOREIGN PATENT DOCUMENTS

AT    331204 T     7/2006
BR    0316110      9/2005
(Continued)

OTHER PUBLICATIONS

Ackermann, Prospects of Kinematic GPS Aerial Triangulation, ITC Journal, 1992.
(Continued)

*Primary Examiner* — Luke D Ratcliffe
(74) *Attorney, Agent, or Firm* — Dunlap Codding, P.C.

(57) ABSTRACT

A light deflection system for a LIDAR system on an aerial vehicle and method of use are herein disclosed. The light deflection system includes a light deflection element having a first end and a second end. The light deflection element is rotatable and balanced about an axis extending from the first end to the second end. The light deflection element has a first side with a first reflective surface at a first angle in relation to the axis and deflects light in a nadir direction relative to the aerial vehicle. The light deflection element also has a second side having a second reflective surface at a second angle in relation to the axis. The first angle is different from the second angle and configured to deflective light at an oblique angle relative to the aerial vehicle.

17 Claims, 9 Drawing Sheets

Related U.S. Application Data continuation of application No. 13/797,172, filed on Mar. 12, 2013, now Pat. No. 9,244,272.

(51) Int. Cl.
- *G02B 26/12* (2006.01)
- *G01S 17/42* (2006.01)
- *G01S 7/484* (2006.01)
- *G01S 17/08* (2006.01)

(58) Field of Classification Search
CPC .... G02B 26/12; G02B 26/121; G02B 26/123; G02B 26/124; G02B 26/125; G02B 26/126; G02B 26/127; G02B 26/128; G02B 26/129; G02B 26/108
See application file for complete search history.

(56) References Cited

U.S. PATENT DOCUMENTS

| | | |
|---|---|---|
| 3,594,556 A | 7/1971 | Edwards |
| 3,614,410 A | 10/1971 | Bailey |
| 3,621,326 A | 11/1971 | Hobrough |
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,418,608 A | 5/1995 | Caimi et al. |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,561,545 A | 10/1996 | Kaino et al. |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,037,945 A | 3/2000 | Loveland |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,147,747 A | 11/2000 | Kavaya et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,480,270 B1 | 11/2002 | Studnicka et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 | 6/2004 | Bennett |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,834,128 B1 | 12/2004 | Altunbasak et al. |
| 6,852,975 B2 | 2/2005 | Riegl et al. |
| 6,876,763 B2 | 4/2005 | Sorek et al. |
| 6,879,384 B2 | 4/2005 | Riegl et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,133,551 B2 | 11/2006 | Chen |
| 7,142,984 B2 | 11/2006 | Rahmes et al. |
| 7,184,072 B1 | 2/2007 | Loewen et al. |
| 7,233,691 B2 | 6/2007 | Setterholm |
| 7,262,790 B2 | 8/2007 | Bakewell |
| 7,330,242 B2 | 2/2008 | Reichert et al. |
| 7,348,895 B2 | 3/2008 | Lagassey |
| 7,509,241 B2 | 3/2009 | Guo |

(56) References Cited

U.S. PATENT DOCUMENTS

| | | | |
|---|---|---|---|
| 7,697,120 B2 | 4/2010 | Reichert et al. | |
| 7,728,833 B2 | 6/2010 | Verma | |
| 7,832,267 B2 | 11/2010 | Wore | |
| 7,844,499 B2 | 11/2010 | Yahiro | |
| 8,078,396 B2 | 12/2011 | Meadow | |
| 8,120,754 B2 | 2/2012 | Kaehler | |
| 8,665,454 B2 | 3/2014 | Fowler et al. | |
| 8,705,843 B2 | 4/2014 | Lieckfeldt | |
| 9,618,742 B1* | 4/2017 | Droz | G02B 7/181 |
| 2002/0041328 A1 | 4/2002 | LeCompte et al. | |
| 2002/0041717 A1 | 4/2002 | Murata et al. | |
| 2002/0114536 A1 | 8/2002 | Xiong et al. | |
| 2002/0140924 A1 | 10/2002 | Wangler et al. | |
| 2003/0014224 A1 | 1/2003 | Guo et al. | |
| 2003/0043824 A1 | 3/2003 | Remboski et al. | |
| 2003/0088362 A1 | 5/2003 | Melero et al. | |
| 2003/0164962 A1 | 9/2003 | Nims et al. | |
| 2003/0214585 A1 | 11/2003 | Bakewell | |
| 2004/0105090 A1 | 6/2004 | Schultz et al. | |
| 2004/0141170 A1* | 7/2004 | Jamieson | G01S 17/89 356/612 |
| 2004/0167709 A1 | 8/2004 | Smitherman et al. | |
| 2004/0212863 A1* | 10/2004 | Schanz | G02B 26/108 359/211.2 |
| 2005/0073241 A1 | 4/2005 | Yamauchi et al. | |
| 2005/0088251 A1 | 4/2005 | Matsumoto | |
| 2005/0169521 A1 | 8/2005 | Hel-Or | |
| 2006/0028550 A1 | 2/2006 | Palmer et al. | |
| 2006/0092043 A1 | 5/2006 | Lagassey | |
| 2006/0238383 A1 | 10/2006 | Kimchi et al. | |
| 2006/0250515 A1 | 11/2006 | Koseki et al. | |
| 2007/0024612 A1 | 2/2007 | Balfour | |
| 2007/0046448 A1 | 3/2007 | Smitherman | |
| 2007/0237420 A1 | 10/2007 | Steedly et al. | |
| 2008/0120031 A1 | 5/2008 | Rosenfeld et al. | |
| 2008/0123994 A1 | 5/2008 | Schultz et al. | |
| 2008/0158256 A1 | 7/2008 | Russell et al. | |
| 2009/0177458 A1 | 7/2009 | Hochart et al. | |
| 2009/0208095 A1 | 8/2009 | Zebedin | |
| 2009/0304227 A1 | 12/2009 | Kennedy et al. | |
| 2010/0053593 A1 | 3/2010 | Bedros et al. | |
| 2010/0296693 A1 | 11/2010 | Thornberry et al. | |
| 2011/0033110 A1 | 2/2011 | Shimamura et al. | |
| 2013/0246204 A1 | 9/2013 | Thornberry et al. | |
| 2013/0342822 A1* | 12/2013 | Shiraishi | G01S 17/88 356/4.01 |

FOREIGN PATENT DOCUMENTS

| | | | | |
|---|---|---|---|---|
| CA | 2402234 | | 9/2000 | |
| CA | 2505566 | | 5/2004 | |
| CN | 1735897 | A | 2/2006 | |
| DE | 60017384 | T | 3/2006 | |
| DE | 60306301 | T | 11/2006 | |
| DK | 1418402 | T | 10/2006 | |
| EP | 1010966 | | 2/1999 | |
| EP | 1180967 | | 2/2002 | |
| EP | 1418402 | | 5/2004 | |
| EP | 1696204 | | 8/2006 | |
| ES | 2266704 | T | 3/2007 | |
| JP | 2003/317089 | A | 11/2003 | |
| MX | PA05004987 | | 2/2006 | |
| WO | WO99/18732 | | 4/1999 | |
| WO | WO/2000/053090 | | 9/2000 | |
| WO | WO-0181949 | A2 * | 11/2001 | G01J 3/0218 |
| WO | WO/2004/044692 | | 5/2004 | |
| WO | WO/2005/088251 | | 9/2005 | |
| WO | WO/2008/028040 | | 3/2008 | |
| WO | WO-2012117542 | A1 * | 9/2012 | G01S 17/931 |
| WO | WO2012117542 | A1 | 9/2012 | |

OTHER PUBLICATIONS

Ciampa, John A., "Pictometry Digital Video Mapping", SPIE, vol. 2598, pp. 140-148, 1995.
Ciampa, J. A., Oversee, Presented at Reconstruction After Urban earthquakes, Buffalo, NY, 1989.
Dunford et al., Remote Sensing for Rural Development Planning in Africa, The Journal for the International Institute for Aerial Survey and Earth Sciences, 2:99-108, 1983.
Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.
Konecny, G., "Issues of Digital Mapping", Leibniz University Hannover, Germany, GIS Ostrava 2008, Ostrava 27.—30.1.2008, pp. 1-8.
Konecny, G., "Analytical Aerial Triangulation with Convergent Photography", Department of Surveying Engineering, University of New Brunswick, pp. 37-57, 1966.
Konecny, G., "Interior Orientation and Convergent Photography", Photogrammetric Engineering, pp. 625-634, 1965.
Graham, Lee A., "Airborne Video for Near-Real-Time Vegetation Mapping", Journal of Forestry, 8:28-32, 1993.
Graham, Horita TRG-50 SMPTE Time-Code Reader, Generator, Window Inserter, 1990.
Hess, L.L, et al., "Geocoded Digital Videography for Validation of Land Cover Mapping in the Amazon Basin", International Journal of Remote Sensing, vol. 23, No. 7, pp. 1527-1555, 2002.
Hinthorne, J., et al., "Image Processing in The Grass GIS", Geoscience and Remote Sensing Symposium, 4:2227-2229, 1991.
Imhof, Ralph K., "Mapping from Oblique Photographs", Manual of Photogrammetry, Chapter 18, 1966.
Jensen, John R., Introductory Digital Image Processing: A Remote Sensing Perspective, Prentice-Hall, 1986; 399 pages.
Lapine, Lewis A., "Practical Photogrammetric Control by Kinematic GPS", GPS World, 1(3):44-49, 1990.
Lapine, Lewis A., Airborne Kinematic GPS Positioning for Photogrammetry—The Determination of the Camera Exposure Station, Silver Spring, MD, 11 pages, at least as early as 2000.
Linden et al., Airborne Video Automated Processing, US Forest Service Internal report, Fort Collins, CO, 1993.
Myhre, Dick, "Airborne Video System Users Guide", USDA Forest Service, Forest Pest Management Applications Group, published by Management Assistance Corporation of America, 6 pages, 1992.
Myhre et al., "An Airborne Video System Developed Within Forest Pest Management—Status and Activities", 10 pages, 1992.
Myhre et al., "Airborne Videography—A Potential Tool for Resource Managers"—Proceedings: Resource Technology 90, 2nd International Symposium on Advanced Technology in Natural Resource Management, 5 pages, 1990.
Myhre et al., Aerial Photography for Forest Pest Management, Proceedings of Second Forest Service Remote Sensing Applications Conference, Slidell, Louisiana, 153-162, 1988.
Myhre et al., "Airborne Video Technology", Forest Pest Management/ Methods Application Group, Fort Collins, CO, pp. 1-6, at least as early as Jul. 30, 2006.
Norton-Griffiths et al., 1982. "Sample surveys from light aircraft combining visual observations and very large scale color photography". University of Arizona Remote Sensing Newsletter 82-2:1-4.
Norton-Griffiths et al., "Aerial Point Sampling for Land Use Surveys", Journal of Biogeography, 15:149-156, 1988.
Novak, Rectification of Digital Imagery, Photogrammetric Engineering and Remote Sensing, 339-344, 1992.
Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.
Slaymaker, et al., "Madagascar Protected Areas Mapped with GPS-logged Aerial Video and 35mm Air Photos", Earth Observation magazine, vol. 9, No. 1, http://www.eomonline.com/Common/ Archives/2000jan/00jan_tableofcontents.html, pp. 1-4, 2000.
Slaymaker, et al., "Cost-effective Determination of Biomass from Aerial Images", Lecture Notes In Computer Science, 1737:67-76, http://portal.acm.org/citation.cfm?id=648004.743267&coll=GUIDE &dl=, 1999.

(56) References Cited

OTHER PUBLICATIONS

Slaymaker, et al., "A System for Real-time Generation of Georeferenced Terrain Models", 4232A-08, SPIE Enabling Technologies for Law Enforcement Boston, MA, ftp://vis-ftp.cs.umass.edu/Papers/schultz/spie2000.pdf, 2000.
Slaymaker, et al.,"Integrating Small Format Aerial Photography, Videography, and a Laser Profiler for Environmental Monitoring", In ISPRS WG III/1 Workshop on Integrated Sensor Calibration and Orientation, Portland, Maine, 1999.
Slaymaker, et al., "Calculating Forest Biomass With Small Format Aerial Photography, Videography And A Profiling Laser", In Proceedings of the 17th Biennial Workshop on Color Photography and Videography in Resource Assessment, Reno, NV, 1999.
Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.
Star et al., "Geographic Information Systems an Introduction", Prentice-Hall, 1990.
Tomasi et al., "Shape and Motion from Image Streams: a Factorization Method"—Full Report on the Orthographic Case, pp. 9795-9802, 1992.
Warren, Fire Mapping with the Fire Mousetrap, Aviation and Fire Management, Advanced Electronics System Development Group, USDA Forest Service, 1986.
Welch, R., "Desktop Mapping with Personal Computers", Photogrammetric Engineering and Remote Sensing, 1651-1662, 1989.
Westervelt, James, "Introduction to GRASS 4", pp. 1-25, 1991.
"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
ERDAS Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", MicroImages, Inc., Lincoln, NE, 1 page, Dec. 1992.
Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
"POS AV" georeferenced by APPLANIX aided inertial technology, http://www.applanix.com/products/posav_index.php.
Mostafa, et al., "Ground Accuracy from Directly Georeferenced Imagery", Published in GIM International vol. 14 N. Dec. 12, 2000.
Mostafa, et al., "Airborne Direct Georeferencing of Frame Imagery: An Error Budget", The $3^{rd}$ International Symposium on Mobile Mapping Technology, Cairo, Egypt, Jan. 3-5, 2001.
Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.
Mostafa, "ISAT Direct Exterior Orientation QA/QC Strategy Using POS Data", Proceedings of OEEPE Workshop: Integrated Sensor Orientation, Hanover, Germany, Sep. 17-18, 2001.
Mostafa, "Camera/IMU Boresight Calibration: New Advances and Performance Analysis", Proceedings of the ASPRS Annual Meeting, Washington, D.C., Apr. 21-26, 2002.

Hiatt, "Sensor Integration Aids Mapping at Ground Zero", Photogrammetric Engineering and Remote Sensing, Sep. 2002, p. 877-878.
Mostafa, "Precision Aircraft GPS Positioning Using CORS", Photogrammetric Engineering and Remote Sensing, Nov. 2002, p. 1125-1126.
Mostafa, et al., System Performance Analysis of INS/DGPS Integrated System for Mobile Mapping System (MMS), Department of Geomatics Engineering, University of Calgary, Commission VI, WG VI/4, Mar. 2004.
Artes F., & Hutton, J., "GPS and Inertial Navigation Delivering", Sep. 2005, GEOconnexion International Magazine, p. 52-53, Sep. 2005.
"POS AV" APPLANIX, Product Outline, airborne@applanix.com, 3 pages, Mar. 28, 2007.
POSTrack, "Factsheet", APPLANIX, Ontario, Canada, www.applanix.com, Mar. 2007.
POS AV "Digital Frame Camera Applications", 3001 Inc., Brochure, 2007.
POS AV "Digital Scanner Applications", Earthdata Brochure, Mar. 2007.
POS AV "Film Camera Applications" AeroMap Brochure, Mar. 2007.
POS AV "LIDAR Applications" MD Atlantic Brochure, Mar. 2007.
POS AV "OEM System Specifications", 2005.
POS AV "Synthetic Aperture Radar Applications", Overview, Orbisat Brochure, Mar. 2007.
"POSTrack V5 Specifications" 2005.
"Remote Sensing for Resource Inventory Planning and Monitoring", Proceeding of the Second Forest Service Remote Sensing Applications Conference—Slidell, Louisiana and NSTL, Mississippi, Apr. 11-15, 1988.
"Protecting Natural Resources with Remote Sensing", Proceeding of the Third Forest Service Remote Sensing Applications Conference—Apr. 9-13, 1990.
Heipke, et al, "Test Goals and Test Set Up for the OEEPE Test—Integrated Sensor Orientation", 1999.
Kumar, et al., "Registration of Video to Georeferenced Imagery", Sarnoff Corporation, CN5300, Princeton, NJ, 1998.
McConnel, Proceedings Aerial Pest Detection and Monitoring Workshop—1994.pdf, USDA Forest Service Forest Pest Management, Northern Region, Intermountain region, Forest Insects and Diseases, Pacific Northwest Region.
"Standards for Digital Orthophotos", National Mapping Program Technical Instructions, US Department of the Interior, Dec. 1996.
Tao, "Mobile Mapping Technology for Road Network Data Acquisition", Journal of Geospatial Engineering, vol. 2, No. 2, pp. 1-13, 2000.
"Mobile Mapping Systems Lesson 4", Lesson 4 SURE 382 Geographic Information Systems II, pp. 1-29, Jul. 2, 2006.
Konecny, G., "Mechanische Radialtriangulation mit Konvergentaufnahmen", BILDMESSUNG und LUFTBILDWESEN, 1958, Nr. 1.
Myhre, "ASPRS/ACSM/RT 92" Technical papers, Washington, D.C., vol. 5 Resource Technology 92, Aug. 3-8, 1992.
Rattigan, "Towns get new view from above," *The Boston Globe*, Sep. 5, 2002.
Mostafa, et al., "Digital image georeferencing from a multiple camera system by GPS/INS," *ISPRS Journal of Photogrammetry & Remote Sensing*, 56(I): 1-12, Jun. 2001.
Dillow, "Grin, or bare it, for aerial shot," *Orange County Register* (California), Feb. 25, 2001.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer NewsState & Local*, 7(12), Dec. 2001.
Garrett, "Pictometry: Aerial photography on steroids," *Law Enforcement Technology* 29(7):114-116, Jul. 2002.
Weaver, "County gets an eyeful," *The Post-Standard* (Syracuse, NY), May 18, 2002.
Reed, "Firm gets latitude to map O.C. in 3D," *Orange County Register* (California), Sep. 27, 2000.

(56) References Cited

OTHER PUBLICATIONS

Reyes, "Orange County freezes ambitious aerial photography project," *Los Angeles Times*, Oct. 16, 2000.
Aerowest Pricelist of Geodata as of Oct. 21, 2005 and translations to English 3 pages.
www.archive.org Web site showing archive of German AeroDach Web Site http://www.aerodach.de from Jun. 13, 2004 (retrieved Sep. 20, 2012) and translations to English 4 pages.
AeroDach® Online Roof Evaluation Standard Delivery Format and 3D Data File: Document Version 01.00.2002 with publication in 2002, 13 pages.
Noronha et al., "Detection and Modeling of Building from Multiple Aerial Images," Institute for Robotics and Intelligent Systems, University of Southern California, Nov. 27, 2001, 32 pages.
Applicad Reports dated Nov. 25, 1999-Mar. 9, 2005, 50 pages.
Applicad Online Product Bulletin archive from Jan. 7, 2003, 4 pages.
Applicad Sorcerer Guide, Version 3, Sep. 8, 1999, 142 pages.
Xactimate Claims Estimating Software archive from Feb. 12, 2010, 8 pages.
Bignone et al, Automatic Extraction of Generic House Roofs from High Resolution Aerial Imagery, Communication Technology Laboratory, Swiss Federal Institute of Technology ETH, CH-8092 Zurich, Switzerland, 12 pages, 1996.
Geospan 2007 Job proposal.
Greening et al., Commercial Applications of GPS-Assisted Photogrammetry, Presented at GIS/LIS Annual Conference and Exposition, Phoenix, AZ, Oct. 1994.
Applanix Corp, Robust, Precise Position and Orientation Solutions, POS/AV & POS/DG Installation & Operation Manual, Redefining the way you survey, May 19, 1999, Ontario, Canada.
Applanix Corp, Robust, Precise Position and Orientation Solutions, POS/AV V4 Ethernet & Disk Logging ICD, Redefining the way you survey, Revision 3, Apr. 18, 2001, Ontario, Canada.
Petrie, Current Developments in Airborne Laser Scanning Technologies, IX International Scientific & Technical Conference "From Imagery to Map: Digital Photogrammetric Technologies," Oct. 5-8, 2009, Attica, Greece.

* cited by examiner

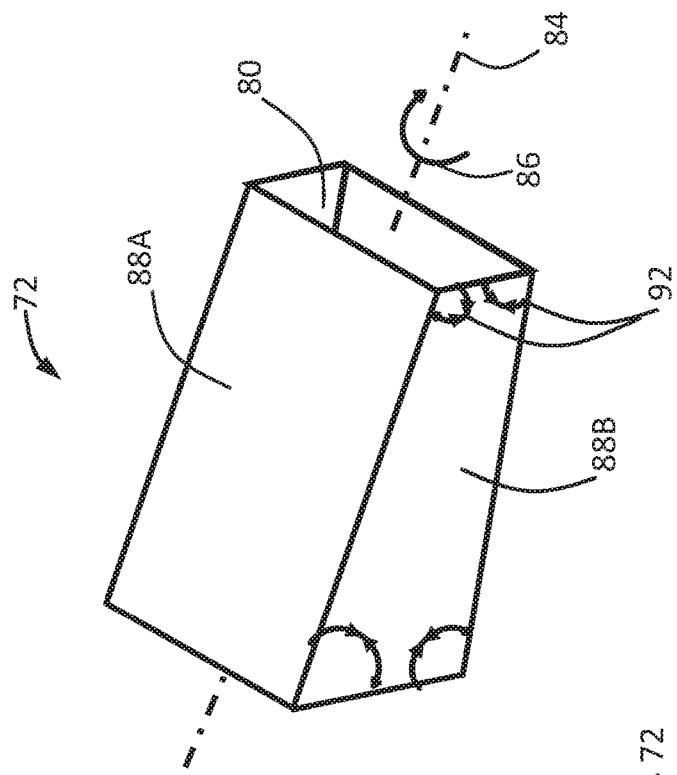
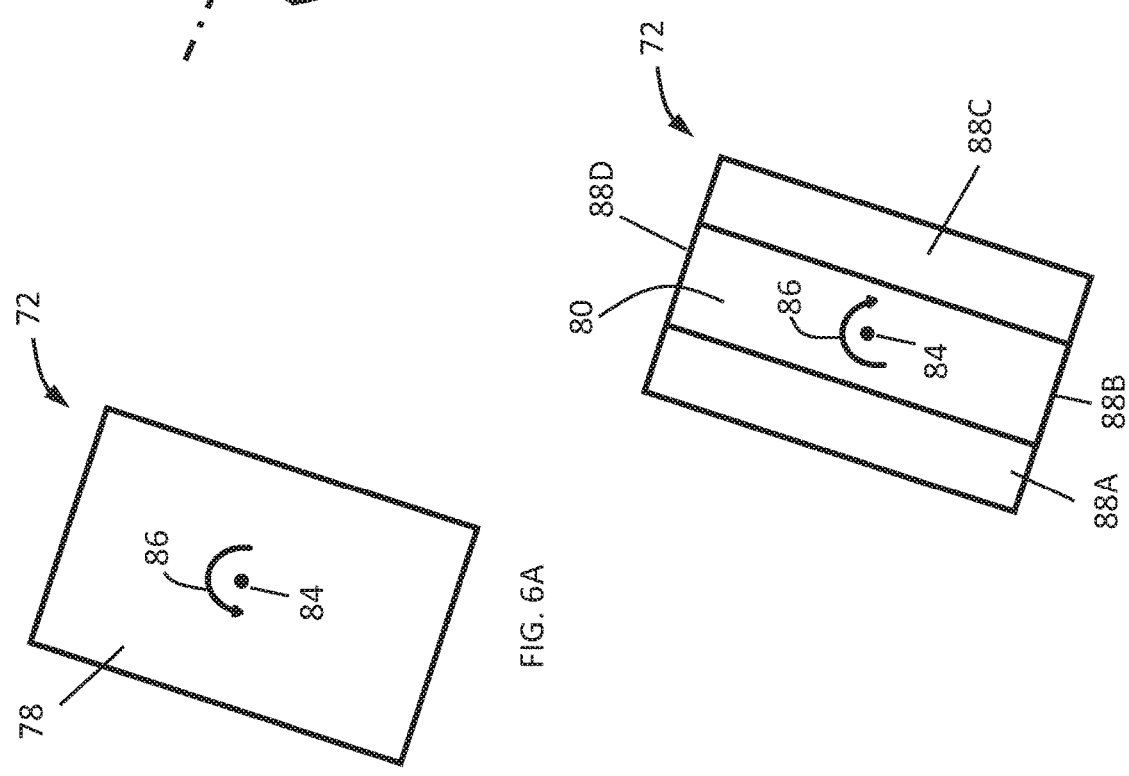

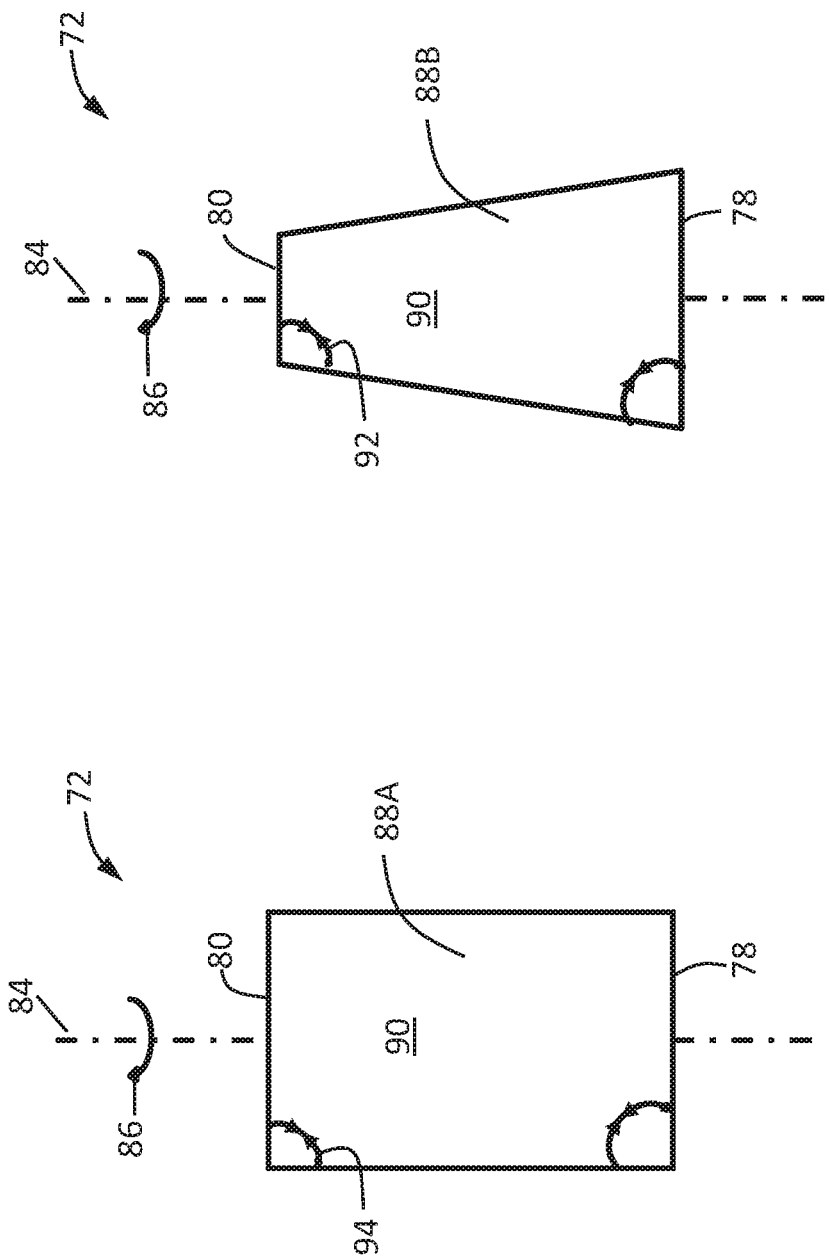

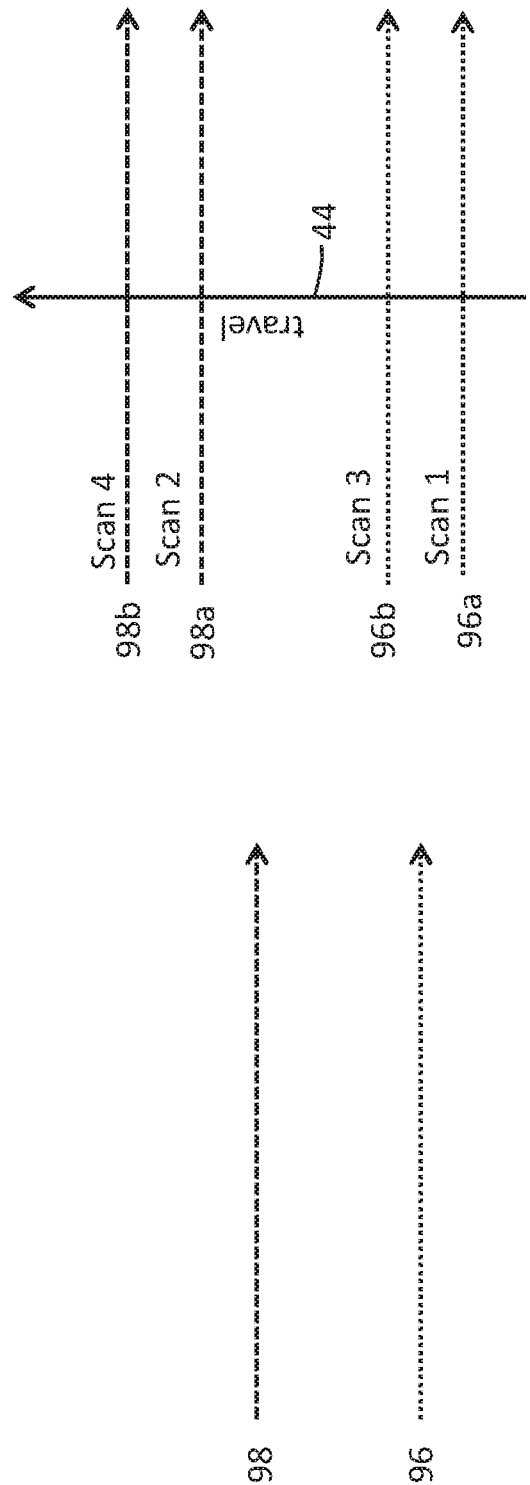

LIDAR SYSTEM PRODUCING MULTIPLE SCAN PATHS AND METHOD OF MAKING AND USING SAME

CROSS-REFERENCE TO RELATED APPLICATIONS

The present patent application is a continuation of the patent application identified by U.S. Ser. No. 14/993,725, filed on Jan. 12, 2016, which is a continuation of U.S. Ser. No. 13/797,172, filed on Mar. 12, 2013, the entire contents of both are hereby incorporated by reference in their entirety.

FIELD OF THE DISCLOSURE

The disclosure generally relates to methods and apparatuses for creating multiple scan paths for a light detection and ranging (LiDAR) system. More particularly the disclosure relates to a LiDAR system designed to create multiple discrete scan paths.

BACKGROUND

Light Detection and Ranging (LiDAR) systems, also known as Laser Detection and Ranging (LaDAR) systems, in simplistic form, bounce a beam of light off a distant object and measure the precise amount of time it takes for that beam to return to the sensor.

Bouncing a light beam off of an object allows a LiDAR system to determine the distance to the object based on the speed of light and the time taken by the light to travel the distance to the object and back. In other words, LiDAR systems can be used for calculating how far the light traveled during the very short span of time from when the light beam's pulse left the laser in the system to when the light beam returned to a sensor in the system.

LiDAR systems typically include a deflection element that deflects the light beam in a specified direction before the light beam leaves the system. There are currently a number of methods to deflect the light beam with the deflection element such that the light beam sweeps or scans a path along the ground. One such method of producing this sweep is to use a rotating mirror as the deflection element.

Currently, the rotating mirrors used as deflection elements are typically an element having a cross-section in the form of a regular polygon shape in which all of the sides are the same length, such as a triangle, square, pentagon, hexagon, or other regular polygon shape. These shapes are also known as "extruded polygons" or regular polyhedrons, and can be described as a three-dimensional shape whose faces are regular polygons. The shape of a regular polyhedron may be visualized as a two-dimensional regular polygon that has been lengthened, at ninety degrees from the two-dimensional plane, so that the sides of the regular polygon have a height, forming a three-dimensional shape.

An exemplary conventional deflection element with a regular polyhedron shape is illustrated in FIG. 1a and FIG. 1b. In FIG. 1a and FIG. 1b, the deflection element has four sides A, B, C, and D. The sides of the conventional deflection element are positioned parallel to a central axis, also referred to as an optical axis, about which the conventional deflection element rotates.

As the light beam hits the surface of one of the sides of the deflection element, a reflective surface, such as a mirror, on the deflection element redirects the light beam along a path. In an aerial LiDAR system, for example one mounted on a satellite or aircraft, the path is typically perpendicular to the direction of travel of the aircraft and is typically aimed directly beneath (nadir to) the capture platform of the aircraft.

However, in some applications, it is desirable to not only acquire a directly nadir scan, but it is also desirable to capture an obliquely aimed scan, adapted to scan the vertical surfaces of buildings, structures, or other vertical objects in the path of travel.

SUMMARY

A method and system are disclosed. A light deflection system for a LIDAR system on an aerial vehicle and method of use are herein disclosed. The light deflection system includes a light deflection element having a first end and a second end. The light deflection element is rotatable and balanced about an axis extending from the first end to the second end. The light deflection element has a first side with a first reflective surface at a first angle in relation to the axis and deflects light in a nadir direction relative to the aerial vehicle. The light deflection element also has a second side having a second reflective surface at a second angle in relation to the axis. The first angle is different from the second angle and configured to deflective light at an oblique angle relative to the aerial vehicle.

A light deflection system for a LIDAR system and method of use is disclosed. The light deflection system includes a light deflection element having a first end and a second end. The light deflection element is rotatable and balanced about an axis extending from the first end to the second end. The light deflection element has a first reflective surface positioned at a first angle in relation to the axis, a second reflective surface positioned at a second angle in relation to the axis, and a third reflective surface positioned at a third angle in relation to the axis. The first angle, the second able and the third angle are all different angles.

A light deflection system for a LIDAR system on an aerial vehicle is disclosed. The light deflection system includes a light deflection element has a first end and a second end. The light deflection system is rotatable and balanced about an axis extending from the first end to the second end. The light deflection element includes a first reflective surface and a third reflective surface positioned at a non-zero degree angle in relation to the axis and configured to deflect light at an oblique angle relative to the aerial vehicle. The light deflection element also includes a second reflective surface and a fourth reflective surface positioned at a zero degree angle in relation to the axis and configured to deflect light in a nadir direction relative to the aerial vehicle.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and not every component may be labeled in every drawing. In the drawings:

FIG. 6A is an illustration of a view of the first end of the exemplary deflection element constructed in accordance with the present disclosure with four external sides, of which two sides of the deflection element are positioned at a thirty degree angle towards the axis and two sides are positioned at a zero degree angle towards (parallel to) the axis.

FIG. 6B is an illustration of a perspective view of the exemplary deflection element constructed in accordance with the present disclosure with four external sides, of which two sides of the deflection element are positioned at a thirty degree angle towards the axis and two sides are positioned at a zero degree angle towards (parallel to) the axis.

FIG. 6C is an illustration of a view of the second end of the exemplary deflection element with four external sides, of which two sides of the deflection element are positioned at a thirty degree angle towards the axis and two sides are positioned at a zero degree angle towards (parallel to) the axis.

FIG. 6D is an illustration of a view of the first side of the exemplary deflection element constructed in accordance with the present disclosure with four external sides, of which two sides of the deflection element are positioned at a thirty degree angle towards the axis and two sides are positioned at a zero degree angle towards (parallel to) the axis.

FIG. 6E is an illustration of a view of the second side of the exemplary deflection element constructed in accordance with the present disclosure with four external sides, of which two sides of the deflection element are positioned at a thirty degree angle towards the axis and two sides are positioned at a zero degree angle towards (parallel to) the axis.

FIG. 7 is an illustration of the sweep of pulses produced by the exemplary LiDAR scanning system from a stationary platform, including a deflection element with four external sides, of which two sides of the deflection element are positioned at a first angle in relation to the axis of the deflection element and two sides are positioned at a second angle in relation to to the axis.

FIG. 8 is an illustration of the sweep of pulses produced by the system from a forward moving platform, including the deflection element with the four external facets.

DETAILED DESCRIPTION

Figure 1B:
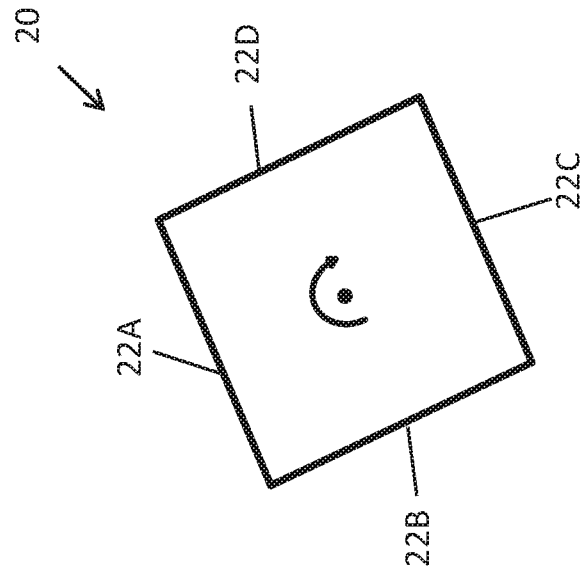
FIG. 1B is an illustration of an end view of an exemplary conventional deflection element.

The following detailed description refers to the accompanying drawings. The same reference numbers in different drawings may identify the same or similar elements.

The mechanisms proposed in this disclosure circumvent the problems described above. The present disclosure describes a light detection and ranging (LiDAR) system and method, the LiDAR system including a extruded polygon with facets with reflective surfaces, at least one the facets angled in relation to an optical axis.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As discussed above, the current technology does not provide for creating multiple discrete scan paths at different angles with light detection and ranging (LiDAR) systems. The present disclosure addresses these deficiencies with methodologies and systems including a deflection element having a first end and a second end, the light deflection element rotatable and balanced about an axis extending from the first end to the second end, the light deflection element further having at least three sides extending between the first end and the second end, at least two of the three sides having reflective surfaces, wherein at least a first side of the at least three sides has a first reflective surface and is at a first angle in relation to the axis, and at least a second side of the at least three sides has a second reflective surface and is at a second angle in relation to the axis, with the first angle being different from the second angle, the light deflection element being rotatable about the axis such that light is deflectable from the first and second reflective surface of the first and second sides, wherein upon actuation of a light source and rotation of the light deflection element, the LiDAR scanning system forms at least a first scan path and a second scan path.

Figure 1A:
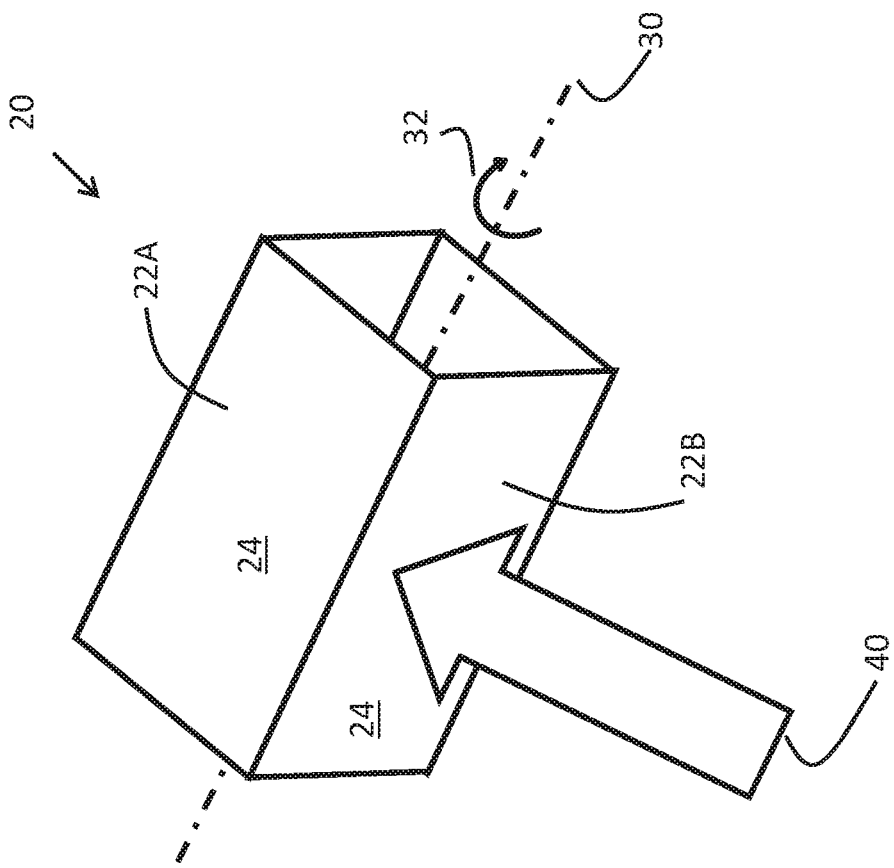
FIG. 1A is an illustration of a perspective view of an exemplary conventional deflection element.

FIG. 1a is an illustration of a perspective view of an exemplary conventional deflection element 20 with four sides 22 with reflective surfaces 24. FIG. 1b is an illustration of an end view of the conventional deflection element 20. The exemplary conventional deflection element 20 shown has four sides 22A, 22B, 22C, and 22D. Each side 22 is approximately parallel to a central axis 30, sometimes referred to as an optical axis, about which the conventional deflection element 20 rotates as designated by rotation arrow 32.

The LiDAR system 34 (not shown) is typically mounted to a platform above the ground, for example, on an aerial vehicle. Within the LiDAR system 34 on the platform, a light beam 40 (such as a laser beam or any appropriate light beam) is produced and aimed at the conventional deflection element 20. As the conventional deflection element 20 rotates about the axis 30, the light beam 40 hits different portions of the rotating side 22 of the conventional deflection element 20.

Figure 2C:
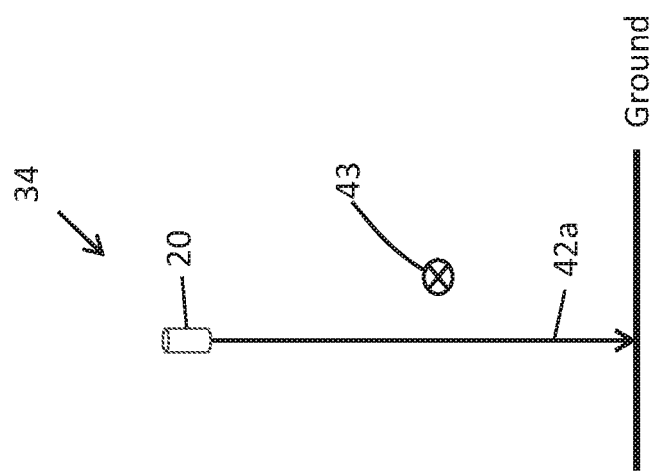
FIG. 2C is an illustration of a side view of a sweep of pulses produced by the deflection of a light beam by the exemplary conventional deflection element from a stationary platform.
Figure 2B:
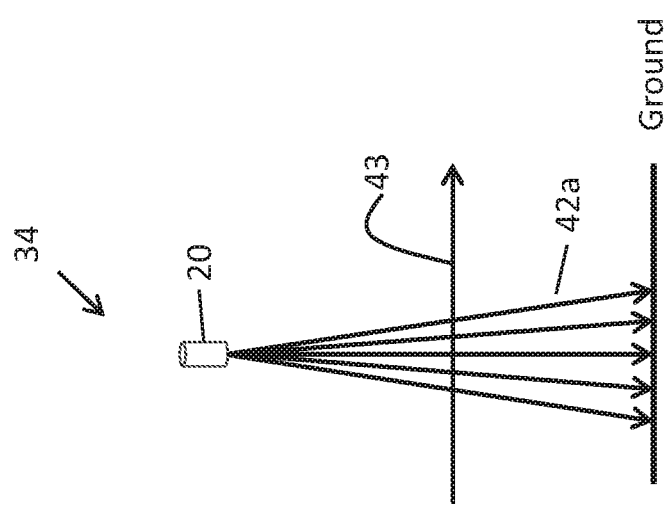
FIG. 2B is an illustration of a front view of a sweep of pulses produced by the deflection of a light beam by the exemplary conventional deflection element from a stationary platform.
Figure 2A:
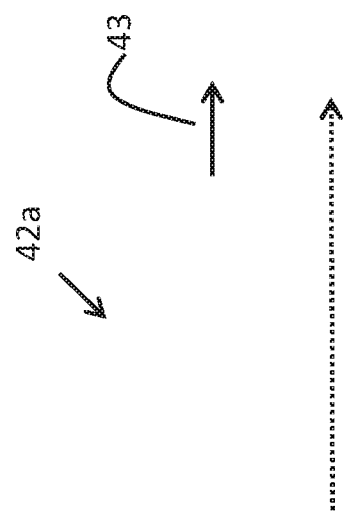
FIG. 2A is an illustration of a top view of a sweep of pulses produced by the deflection of a light beam by the exemplary conventional deflection element from a stationary platform.

FIG. 2a, FIG. 2b, and FIG. 2c illustrate a top view, a front view, and a side view, respectively, of a sweep of pulses, that is, a scan path 42a, produced by the deflection of the light beam 40 by an exemplary conventional deflection element 20 from a stationary LiDAR system 34. As illustrated in FIG. 2a, the deflection of the light beam 40 by different portions of the rotating side 22 of the conventional deflection element 20 causes the deflected light beam 40 to progress across the ground in scan path 42a below the LiDAR system 34, with the progression of the scan path 42a in points going from left to right or right to left, depending on the direction of rotation of the conventional deflection element 20. FIG. 2a depicts the scan path 42a going from left to right, from a top view; arrow 43 indicates the direction of the scan path 42a. FIG. 2b depicts the LiDAR system 34 with conventional deflection element 20

When the deflection element 20 rotates such that the light beam bounces off the next side of the deflection element 20, the progression of the light beam 40 across the ground jumps back to the beginning of the same scan path 42a, the same points on the ground, for example, to the left. If the LiDAR system 34 is stationary, the LiDAR system 34 would repeatedly scan the same points on the ground, referred to as a scan line or scan path 42a. Each subsequent sweep is still aimed straight down when viewed perpendicularly to the direction of travel, as illustrated in FIG. 2c depicting a side view of LiDAR system 34 with deflected light beam 40.

Figure 3C:
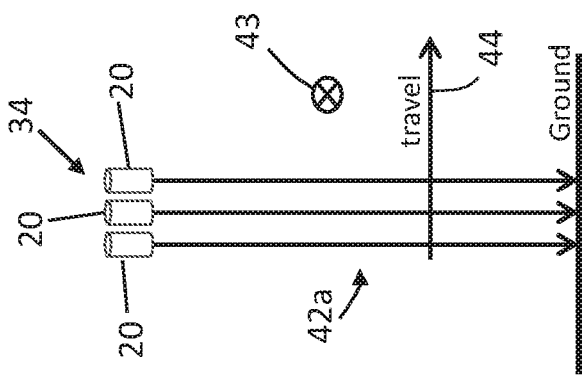
FIG. 3C is an illustration of a side view of multiple sweeps of pulses produced by the deflection of a light beam by the exemplary conventional deflection element from a moving platform.
Figure 3B:
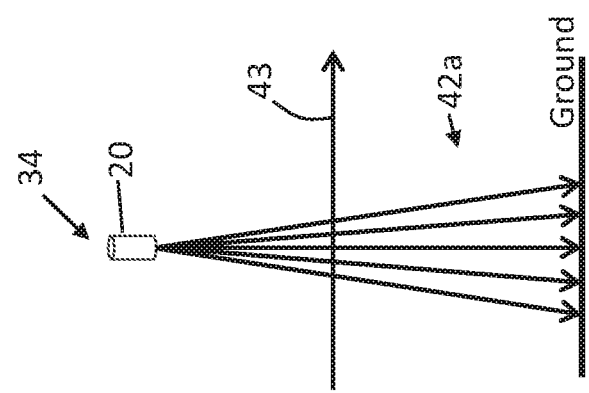
FIG. 3B is an illustration of a front view of multiple sweeps of pulses produced by the deflection of a light beam by the exemplary conventional deflection element from a moving platform.
Figure 3A:
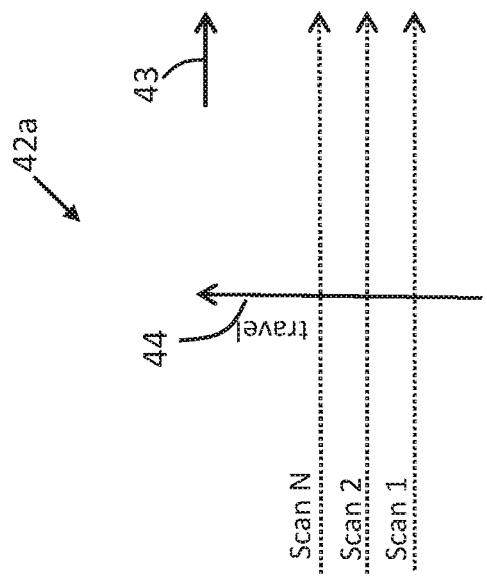
FIG. 3A is an illustration of a top view of multiple sweeps of pulses produced by the deflection of a light beam by the exemplary conventional deflection element from a moving platform.

FIG. 3a, FIG. 3b, and FIG. 3c illustrate a top view, a back view, and a side view, respectively, of a scan path 42a (sweep of pulses) produced by the deflection of the light beam 40 by the deflection element 20 from the LiDAR system 34 when the LiDAR system 34 is moving. If the LiDAR system 34 has a forward motion of direction, then the scan path 42a of the deflected light beam 40 gains a slight forward location due to the forward motion. Therefore, when the light beam 40 is bounced off the second side 22B of the rotating conventional deflection element 20, the light beam 40 is still redirected back to the beginning of the scan path 42a (the beginning of the sweep of pulses); however, the light beam 40 is now deflected slightly forward along the direction of travel from the scan path 42a produced by the first side 22A of the deflection element 20. FIG. 3a and FIG. 3c depict scan path 42a at three different positions of the LiDAR system 34, and thus of the deflection element 20. Note the arrow 44 indicates direction of travel of the LiDAR system 34.

Through the forward movement of the LiDAR system 34, the LiDAR system 34 is able to scan a swath of area with multiple scan paths 42a. The data gathered from the scan may be used to create a digital elevation map of the ground.

For scanning in a nadir direction, that is, approximately straight down from the LiDAR system 34, the LiDAR system 34 is oriented such that the light beam 40, when at the centerline of the scan, is aimed directly nadir to the LiDAR system 34, as illustrated in FIG. 2c and FIG. 3c. Because of the direction of the scan, scanning with a conventional deflection element 20 in the nadir direction does not capture the vertical surfaces of buildings, structures, or other vertical objects in the path of travel.

Figure 4:
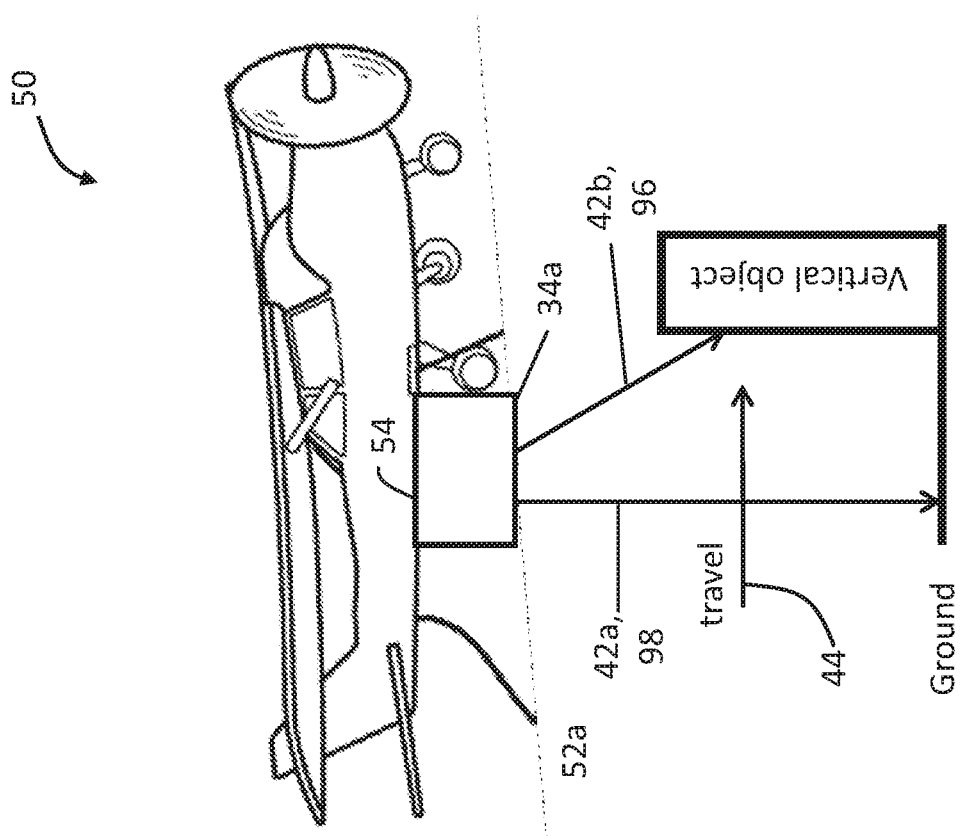
FIG. 4 is an illustration of an exemplary ranging system constructed in accordance with the present disclosure with at least two different scans and with a first scan being a nadir scan and a second scan being an oblique scan.

An oblique scan path is adapted to scan vertical surfaces as well as horizontal surfaces. FIG. 4 is an illustration of an exemplary ranging system 50 with multiple scan path 42 angles, in this example, a scan path 42a nadir to the ranging system 50 and a scan path 42b at an oblique angle to the ranging system 50. The ranging system may comprise a vehicle 52, a light detection and ranging (LiDAR) scanning system 34a carried by the vehicle 52, and a computer 54. The vehicle may be an airplane 52a as shown in FIG. 4, or any type of appropriate vehicle, such as a helicopter, aircraft, satellite, marine vehicle, robot, or automobile. The computer 54 may contain computer instructions stored on a non-transitory computer readable medium and adapted to determine information from the data provided by the LiDAR scanning system 34a, such as calculation of distance. The non-transitory computer readable medium can be random access memory, read only memory, flash memory, optical memory or the like and can be formed by one or more discrete components which are preferably logically linked together.

The LiDAR scanning system 34a may be carried by the vehicle 52 in any appropriate manner, such as attachment to the bottom of the vehicle 52, or attachment to a wing of the vehicle 52 when the vehicle 52 is an aircraft.

Figure 5:
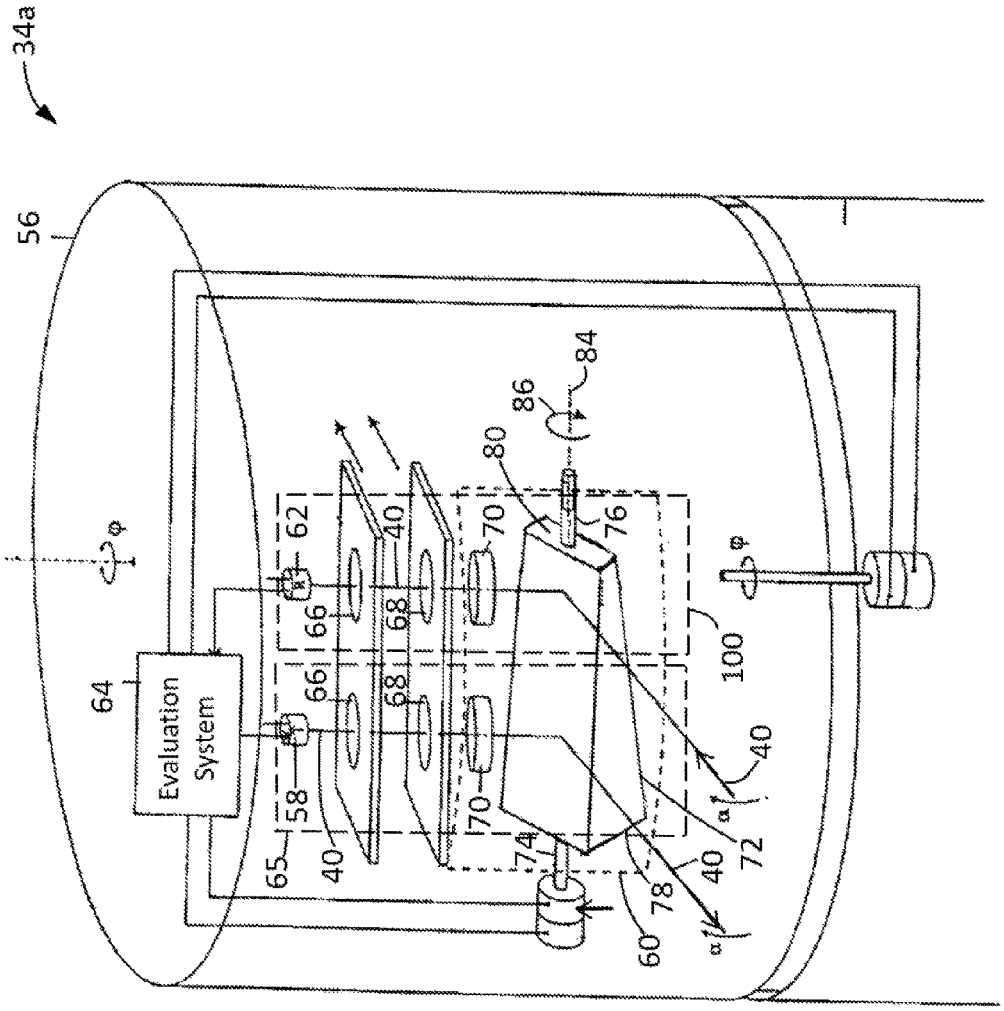
FIG. 5 is an illustration of an exemplary LiDAR scanning system constructed in accordance with the present disclosure.

FIG. 5 is an illustration of an exemplary LiDAR scanning system 34a constructed in accordance with the present disclosure. The LiDAR scanning system 34a may comprise a housing 56, a light source 58 within the housing 56, a light deflection system 60 within the housing 56, and a receiver 62 within the housing 56. The LiDAR scanning system 34a may also comprise an evaluation system 64 within the housing 56, such as one or more computer(s) containing computer instructions, including instructions adapted to determine distance from data gathered by the LiDAR scanning system 34a, such as from a calculated time of travel of the light beam 40 from the light source 58 to an object to be scanned in the scan path 42 and back to the receiver 62. The computer of the evaluation system 64 may be in addition to, or in place of, the computer 54 of the ranging system 50. The evaluation system 64 may include instructions and/or firmware running on the computer.

The light source 58 of the LiDAR scanning system 34a is adapted to transmit light beams 40. Any appropriate light source 58 may be used, for example, laser systems or light emitting diodes. The light source 58 transmits light beams 40 to the light deflection system 60. In one embodiment, the light source 58 transmits the light beams 40 to the light deflection system 60 through a transmitter channel 65 which may include lens systems 66, light dampening elements 68, and optical systems 70. As discussed above, and referring again to FIG. 5, the LiDAR scanning system 34a may also comprise the receiver 62.

The receiver 62 is adapted to receive the light beam 40 after reflection from the scan paths 42. In one embodiment, before being received by the receiver 62, the light beam 40 after reflection from the scan paths 42 returns to the light deflection element 72 which deflects the light beam 40 back to the receiver 62. Or the light beam 40 may be deflected by a second light deflection element 72a. The light may also travel through a receiver channel 100 which may comprise optical components such as lens systems 66, light dampening elements 68, and optical systems 70, before returning to the receiver 62.

The light deflection system 60 of the LiDAR scanning system 34a may comprise a light deflection element 72, a first connector 74, and a second connector 76. The first connector 74 of the light detection system 60 may be aligned with the axis 84 (as shown in FIG. 5) of the light deflection element 72 on the first end 78 of the light deflection element 72 and the second connector 76 of the light detection system 60 may be aligned with the axis 84 on the second end 80 of the light detection element 72. The connectors 74 and 76 may be any appropriate connector, as is well known in the art, for example, tabs, threaded holes, threaded protrusions, splines, and so on. The connectors 74 and 76 may be used to attach the light deflection element to a rotation device, such as a motor. In one embodiment, the light detection system 60 may only include one connector 74.

FIG. 6a, FIG. 6b, FIG. 6c, FIG. 6d, and FIG. 6e, illustrate the exemplary light deflection element 72. FIG. 6b illustrates a perspective view of the light deflection element 72. The light deflection element 72 may have a first end 78 and a second end 80. The light deflection element 72 is rotatable and balanced about the axis 84, which preferably extends from the first end 78 to the second end 80. FIGS. 6a and 6c illustrate a view of the first end 78 and the second end 80, respectively. Direction of rotation is depicted by rotation arrow 86.

Further, the light deflection element 72 may have at least three sides 88 extending between the first end 78 and the second end 80. FIGS. 6d and 6e illustrate a view of the first side 88A and the second side 88B, respectively. The light deflection element 72 may be solid or hollow. At least two of the three sides 88 of the light deflection element have reflective surfaces (not shown), such as mirrored surfaces, or any other appropriate reflective surface. The reflective surface may be attached to the sides 88 or may be a part of the sides 88, for example, the sides 88 may be constructed of or coated with a reflective metal substance.

At least a first side 88A of the three sides of the light deflection element is at a first angle 92 in relation to the axis 84, and at least a second side 88B of the three sides 88 is at a second angle 94 in relation to the axis 84. The first angle 92 is different from the second angle 94. The light deflection element 72 may have different angles on each of the at least three sides 88. In one example, as will be further discussed below, the light deflection element 72 has six sides 88 that are positioned at three different angles.

The light deflection element 72 is rotatable about the axis 84 such that light is deflectable from the reflective surface 90 of the first and second sides 88A and 88B out of the housing 56. Upon actuation of the light source 58 and rotation of the light deflection element 72, the LiDAR scanning system 34a forms at least a first scan path 96 and a second scan path 98, as the light is deflected from the differing angles of the at least first side 88A and second side 88B of the light deflection element 72, as depicted in FIG. 7.

In FIGS. 6a-6e, the exemplary deflection element 72 constructed in accordance with the present disclosure is shown with four external sides 88 where the first side 88A and the third side 88C are at the first angle 92 in relation to the axis 84 of the light deflection element 72, and the second side 88B and the fourth side 88D are at the second angle 94 in relation to the axis 84. For example, the first angle 92 may be a thirty degree angle towards the axis 84 (that is, the sides are tilted thirty degrees) and the second angle 94 may be a zero degree angle towards (parallel to) the axis 84. In other words, if measured from the first end 78 of the light deflection element 72, the first side 88A and third side 88C are positioned sixty degrees from the first end 78 and the second side 88B and fourth side 88D are positioned ninety degrees from the first end 78.

With the configuration described above, when the light deflection element 72 is rotated, the light beam 40 striking the sides 88 is deflected by the first and the third sides 88A and 88C to form the first scan path 96 and by the second and the fourth sides 88B and 88D to form the second scan path 98, such that the first scan path 96 and the second scan path 98 are at different angles, as illustrated in FIG. 4.

If the LiDAR scanning system 34a is stationary, the exemplary rotating light deflection element 72 describe above would deflect the light beam 40 to produce two repeating scan paths—a first scan path 96 thirty degrees in front of the LiDAR scanning system 34a and a second scan path 98 directly beneath the LiDAR scanning system 34a. FIG. 7 is an illustration of the scan paths 96 and 98 (the sweeps of pulses) produced by the exemplary light deflection system 60, in which the first scan path 96 is offset in front of (at an oblique angle to) the LiDAR scanning system 34a and the second scan path 98 is approximately ninety degrees to (nadir to) the LiDAR scanning system 34a.

If the exemplary LiDAR scanning system 34a described above were moving forward in the manner discussed previously, the light deflection system 60 would produce alternating first and second scan paths 96 and 98; again with the first scan path 96 that swept an area thirty degrees in front of (oblique to) the moving LiDAR scanning system 34a and the second scan path 98 that swept an area is approximately ninety degrees to (nadir to) the moving LiDAR scanning system 34a. FIG. 8 is an illustration of the repeating scan paths 96 and 98 produced by an exemplary forward moving LiDAR scanning system 34a. The rotating light deflection element 72 with the four sides and angles described above would produce alternating nadir and oblique scan paths 96 and 98 moving forward with the forward motion of the LiDAR scanning system 34a.

For example, when the four-sided light deflection element 72 rotates within the forward moving LiDAR scanning system 34a, the light beam 40 is deflected from the first side 88A, where the first side 88A is at the first angle 92 of thirty degrees, such that the light deflection element 72 would produce the first scan path 96a at an oblique angle to the LiDAR scanning system 34a. Then, as the light deflection element 72 continues to rotate, the light beam 40 would be deflected from the second side 88B, the second side 88B at the second angle of zero degrees, and would produce a second scan path 98a nadir to the LiDAR scanning system 34a. Next, when the light deflection element 72 rotates to the third side 88C, the light beam 40 would be deflected from the third side 88C, the third side 88C also at the first angle 92 of thirty degrees, producing a third scan path 96b at an oblique angle to the LiDAR scanning system 34a, but forward from the first scan path 96a, in the direction of travel of the LiDAR scanning system 34a. Similarly, when the rotating deflection element 72 rotates to the fourth side 88D, the light beam 40 would be deflected from the fourth side 88D, the fourth side 88D also at the second angle 94 of zero degrees and would produce a fourth scan path 98b nadir to the LiDAR scanning system 34a, but forward from the second scan path 98a, in the direction of travel of the LiDAR scanning system 34a. This pattern would then repeat as the light deflection element 72 continued to rotate.

The oblique angle scan paths, such as scan path 98 described above, can be used to scan vertical surfaces as well as horizontal surfaces. For example, vertical surfaces of natural or man-made structures can be scanned.

For illustrative purposes, a four-sided polygonal light deflection element 72 has initially been described; however, it should be understood that the description applies equally to light deflection elements 72 with three or more sides 88. For example, the light deflection element 72 could be six-sided with two different angled sides 88, or any number of sides 88 that could produce multiple discrete scan paths 102.

Similarly, for illustrative purposes, the described exemplary light deflection element 72 produced two different scan paths 96 and 98 by having only two differing angles 92 and 94 of the sides 88, but it should be understood that the description applies equally to light deflection elements 72 with more than two different angles of the sides 88. For instance, a triangular light deflection element 72 could be used where each side 88 had a different angle, resulting in three different scan paths 102. Or, for instance, a six-sided light deflection element 72 with six different angled sides 88 could produce six different scan paths 102. Or, for instance, an eight-sided light deflection element 72 with six different angled sides 88 could produce six different scan paths 102.

Figure 9:
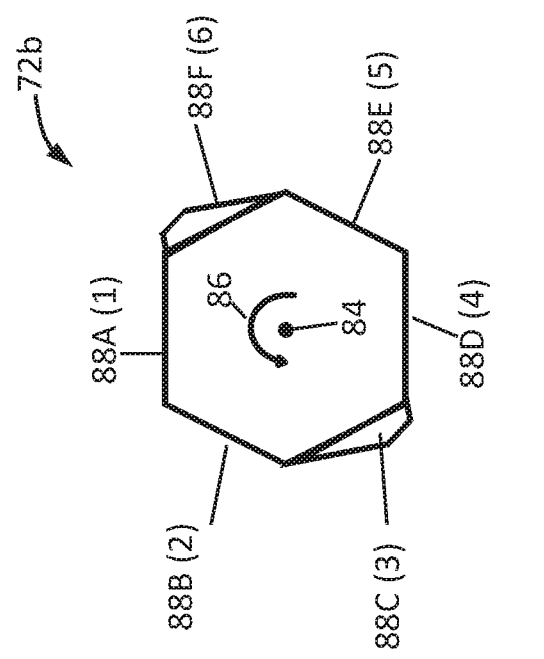
FIG. 9 is an illustration of a view of the first end of the exemplary deflection element with six sides, of which two sides of the deflection element are positioned at a thirty degree angle towards the axis, two sides are positioned at a negative twenty-five degree angle towards the axis, and two sides are positioned at a zero degree angle towards the axis (that is, parallel to the axis).

Additionally, a balanced light deflection element 72 minimizes vibration in the light deflection element 72 during rotation. To maintain balance of the light deflection element 72, a configuration may be used in which opposite sides 88 have the same angle. In one example, as illustrated in FIG. 9, if three scan paths 102 were desired, a hexagonal light deflection element 72b could be used, such as a light deflection element 72b with six sides 88A through 88F with sides 88A and 88D having a zero-degree angle in relation to the axis 84 in order to scan directly beneath the LiDAR scanning system 34a, sides 88B and 88E having a thirty degree angle in relation to the axis 84 in order to scan in front of the LiDAR scanning system 34a, and sides 88C and 88F having a negative twenty-five degree angle in relation to the axis 84 in order to scan in back of the LiDAR scanning system 34a. FIG. 9 illustrates an end view of one such exemplary hexagonal light deflection element 72b. Of course, one skilled in the art would understand that a cross-section of the exemplary light deflection element 72b would be a six-sided polygon with unequal length sides because of the angles of the sides 88 in relation to the axis 84.

Further, it should be understood that a configuration having opposite sides 88 having the same angles as described above is one configuration to aid in balancing a light deflection element 72, however, there are other balancing configurations possible. For example, the light deflection element 72 can be balanced using varying thicknesses of material. For example, the placement of weights may be used in order to balance the light deflection element 72 for rotation.

CONCLUSION

Conventionally, LiDAR systems utilize a rotating polygon mirror to deflect light beams to produce scans in a single scan direction typically aimed in a nadir direction. In accordance with the present disclosure, a method and an apparatus are described including a light deflection element having a first end and a second end, the light deflection element rotatable and balanced about an axis extending from the first end to the second end, the light deflection element further having at least three sides extending between the first end and the second end, at least two of the three sides having reflective surfaces, wherein at least a first side of the three sides is at a first angle in relation to the axis, and at least a second side of the three sides is at a second angle in relation to the axis, with the first angle being different from the second angle, the light deflection element being rotatable about the axis such that light is deflectable from the reflective surface of the first and second sides, wherein upon actuation of a light source and rotation of the light deflection element, the LiDAR scanning system forms at least a first scan path and a second scan path.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A light deflection system for a LIDAR system on an aerial vehicle, comprising:
    a light deflection element having a first end and a second end, the light deflection element rotatable and balanced about an axis extending from the first end to the second end, the light deflection element having:
        a first side with a first reflective surface at a first angle in relation to the axis and configured to deflect light in a nadir direction relative to the aerial vehicle to form a first scan path; and,
        a second side having a second reflective surface at a second angle in relation to the axis, the first angle being different from the second angle and configured to deflect light at an oblique angle relative to the aerial vehicle to form a second scan path different than the first scan path;
        a third side with a third reflective surface at a third angle in relation to the axis to form a third scan path, the third angle being different from the first angle and the second angle;
        a fourth side with a fourth reflective surface at the first angle in relation to the axis;
        a fifth side with a fifth reflective surface at the second angle in relation to the axis; and
        a sixth side with a sixth reflective surface at the third angle in relation to the axis.

2. The light deflection system of claim 1, wherein the light deflection system further comprises a first connector aligned with the axis on the first end.

3. The light deflection system of claim 2, wherein the light deflection system further comprises a second connector aligned with the axis on the second end.

4. The light deflection system of claim 3, wherein the light deflection system further comprises a rotation device and each of the first connector and second connector attach the light deflection element to the rotation device.

5. The light deflection system of claim 4, wherein the rotation device is a motor.

6. The light deflection system of claim 1, wherein the light deflection element is a solid formation.

7. The light deflection system of claim 1, wherein the light deflection element is a hollow formation.

8. The light deflection system of claim 1, wherein the first reflective surface is a mirrored surface.

9. The light deflection system of claim 1, wherein the first reflective surface is comprised of a coated reflective metal.

10. A light deflection system for a LIDAR system on an aerial vehicle, comprising:
- a light deflection element having a first end and a second end, the light deflection element rotatable and balanced about an axis extending from the first end to the second end, the light deflection element having:
  - a first reflective surface positioned at a first angle in relation to the axis configured to deflect light at a first angle relative to the aerial vehicle to form a first scan path;
  - a second reflective surface positioned at a second angle in relation to the axis configured to deflect light at a second angle relative to the aerial vehicle to form a second scan path; and,
  - a third reflective surface positioned at a third angle in relation to the axis configured to deflect light at a third angle relative to the aerial vehicle to form a third scan path;
  - wherein the first angle, the second angle and the third angle are different angles; and
  - wherein the light deflection element has at least six sides with at least two sides positioned at the first angle in relation to the axis, at least two sides positioned at the second angle in relation to the axis, and at least two sides positioned at the third angle in relation to the axis.

11. The light deflection system of claim 10, wherein the light deflection element further comprises a first connector aligned with the axis on the first end and a second connector aligned with the axis on the second end.

12. The light deflection system of claim 11, further comprising a rotation device attached at the first connector and the second connector.

13. The light deflection system of claim 12, wherein the rotation device is a motor.

14. The light deflection system of claim 10, wherein the first reflective surface is a mirrored surface.

15. The light deflection system of claim 10, wherein the first reflective surface is comprised of a coated reflective metal.

16. The light deflection system of claim 10, wherein the light deflection element is a solid formation.

17. A light deflection system for a LIDAR system on an aerial vehicle, comprising:
- a light deflection element having a first end and a second end, the light deflection element rotatable and balanced about an axis extending from the first end to the second end, the light deflection element having:
  - a first reflective surface positioned at a non-zero degree angle in relation to the axis and configured to deflect light at an oblique angle relative to the aerial vehicle;
  - a second reflective surface positioned at a zero degree angle in relation to the axis and configured to deflect light in a nadir direction relative to the aerial vehicle;
  - a third reflective surface positioned at the non-zero degree angle in relation to the axis and configured to deflect light at the oblique angle relative to the aerial vehicle; and,
  - a fourth reflective surface positioned at the zero degree angle in relation to the axis and configured to deflect light in a nadir direction relative to the aerial vehicle.

* * * * *